United States Patent
Devadoss et al.

(10) Patent No.: US 9,018,344 B2
(45) Date of Patent: Apr. 28, 2015

(54) POLYMERS FOR THIN FILM COATINGS

(75) Inventors: Anando Devadoss, Irvine, CA (US); Cuihua Xue, Irvine, CA (US)

(73) Assignees: Hitachi Chemical Company, Ltd, Tokyo (JP); Hitachi Chemical Research Center, Inc., Irvine, CA (US)

( * ) Notice: Subject to any disclaimer, the term of this patent is extended or adjusted under 35 U.S.C. 154(b) by 0 days.

(21) Appl. No.: 14/006,179

(22) PCT Filed: Mar. 28, 2012

(86) PCT No.: PCT/US2012/000173
§ 371 (c)(1),
(2), (4) Date: Sep. 19, 2013

(87) PCT Pub. No.: WO2013/058803
PCT Pub. Date: Apr. 25, 2013

(65) Prior Publication Data
US 2014/0011010 A1    Jan. 9, 2014

Related U.S. Application Data

(60) Provisional application No. 61/468,395, filed on Mar. 28, 2011.

(51) Int. Cl.
*C08G 75/00* (2006.01)
*C08G 75/32* (2006.01)
(Continued)

(52) U.S. Cl.
CPC ............ *C08G 75/32* (2013.01); *C08J 5/2256* (2013.01); *C08G 61/02* (2013.01); *C08G 61/122* (2013.01); *C08G 61/123* (2013.01); *C08G 61/126* (2013.01); *C08G 73/0206* (2013.01); *C08G 2261/124* (2013.01); *C08G 2261/1424* (2013.01); *C08G 2261/145* (2013.01); *C08G 2261/148* (2013.01); *C08G 2261/149* (2013.01); *C08G 2261/312* (2013.01); *C08G 2261/3142* (2013.01); *C08G 2261/3223* (2013.01); *C08G 2261/3241* (2013.01); *C08G 2261/3246* (2013.01); *C08G 2261/51* (2013.01); *C08G 2261/94* (2013.01); *C08G 73/02* (2013.01); *C08F 116/06* (2013.01);
(Continued)

(58) Field of Classification Search
USPC .......... 528/377, 380, 422; 428/220, 408, 457, 428/446; 205/317, 316; 526/238.23
See application file for complete search history.

(56) References Cited

U.S. PATENT DOCUMENTS 3,385,777 A    5/1968    Haycock et al.
4,690,738 A    9/1987    Desarmot et al.
(Continued)

FOREIGN PATENT DOCUMENTS

JP    05-217809 A    8/1993
JP    2009-73921 A    9/2009
JP    61-275826 A    12/2013

OTHER PUBLICATIONS

Derwent 1992-362061, JP 04-264363, 1991.*
(Continued)

*Primary Examiner* — Shane Fang
(74) *Attorney, Agent, or Firm* — Dentons US LLP

(57) ABSTRACT

The present invention provides new materials that combine the advantages of well-defined polymeric starting materials and the convenience of surface modification by physical methods into one package and, thus, offers a general and powerful platform suitable for use in numerous applications.

2 Claims, 3 Drawing Sheets

(51) Int. Cl.
- C08J 5/22 (2006.01)
- C08G 61/02 (2006.01)
- C08G 61/12 (2006.01)
- C08G 73/02 (2006.01)
- C08F 116/06 (2006.01)
- C08F 120/06 (2006.01)
- C08F 126/02 (2006.01)
- C08F 128/02 (2006.01)
- C09D 5/44 (2006.01)

(52) U.S. Cl.
CPC ............ C08F 120/06 (2013.01); C08F 126/02 (2013.01); C08F 128/02 (2013.01); C09D 5/44 (2013.01)

(56) References Cited

U.S. PATENT DOCUMENTS

| | | | |
|---|---|---|---|
| 4,704,196 | A | 11/1987 | Saito et al. |
| 4,844,781 | A | 7/1989 | Sanchez et al. |
| 5,453,335 | A | 9/1995 | Fauteux et al. |
| 6,417,245 | B1 | 7/2002 | Fowler et al. |
| 6,551,495 | B1 | 4/2003 | Porter et al. |
| 6,602,395 | B1 | 8/2003 | Zhuang et al. |
| 7,255,924 | B2 | 8/2007 | Long et al. |
| 7,321,012 | B2 | 1/2008 | Sotzing |
| 2005/0126427 | A1 | 6/2005 | Gonzalez et al. |
| 2006/0237695 | A1 | 10/2006 | Williams et al. |
| 2008/0102386 | A1 | 5/2008 | Swager et al. |
| 2009/0221762 | A1 | 9/2009 | Therien et al. |
| 2009/0293946 | A1 | 12/2009 | Lin et al. |
| 2010/0327271 | A1 | 12/2010 | Uetani |

OTHER PUBLICATIONS

International Search Report issued Sep. 14, 2012, International Application No. PCT/US2012/0001743.

"Light-emitting conjugated polymers with microporous network architecture: interweaving scaffold promotes electronic conjugation, facilitates exciton migration, and improves luminescence," J. Am. Chem. Soc., Nov. 9, 2011, 133 (44) pp. 17622-17625.

"Conjugated Microporous Polymer Networks via Yamamoto Polymerization," Macromolecules, 2009, 42(13), pp. 4426-4429.

"Synthesis, processing and properties of conjugated polymer networks," Chem. Commun., 2005, pp. 5378-5389.

"New Route to Conjugated Polymer Networks: Synthesis of Poly(4-ethynyl)phenylacetylene and Its Transformation into a Conjugated Network," Macromolecules, 1999, 32, pp. 4477-4481.

Weber et al., "Toward Stable Interfaces in Conjugated Polymers: Microporous Poly(p-phenylene) and Poly(phenyleneethynylene) Based on a Spirobifluorene Building Block," J. Am. Chem. Soc. 2008, 130, pp. 6334-6335.

Li et al., "Conjugated Polymer Photovoltaic Materials with Broad Absorption Band and High Charge Carrier Mobility," Advanced Materials [online], Jul. 4, 2008, vol. 20, Issue 15, pp. 2952-2958.

NTS Co., Ltd., Dendritic macromolecules, Oct. 31, 2005, pp. 204-205, 470, Japan.

English language translation of the Official Action issued on Jan. 30, 2015, by the Japanese Patent Office in corresponding Japanese Patent Application No. 2014-502554.

\* cited by examiner

POLYMERS FOR THIN FILM COATINGS

FIELD

The present disclosure relates to polymers for thin film coatings, uses and related methods.

BACKGROUND

In this specification where a document, act or item of knowledge is referred to or discussed, this reference or discussion is not an admission that the document, act or item of knowledge or any combination thereof was at the priority date, publicly available, known to the public, part of common general knowledge, or otherwise constitutes prior art under the applicable statutory provisions; or is known to be relevant to an attempt to solve any problem with which this specification is concerned.

Current technologies for surface modification with polymers use surface-bound monomers to initiate formation of polymers thereon, which leads to a polymer thin film or coating formed on the surface. There are several disadvantages associated with such a type of surface-bound monomer based polymerization, including, but not limited to, difficulties in reproducibility of the surface-bound polymeric thin film structure and decreased electronic and optical properties of the surface-bound polymeric thin film.

Thus, there is a need in the art for consistently reproducible surface-bound polymeric thin film structures that do not exhibit diminished electronic and optical properties.

While certain aspects of conventional technologies have been discussed to facilitate disclosure of the invention, Applicants in no way disclaim these technical aspects, and it is contemplated that the claimed invention may encompass or include one or more of the conventional technical aspects discussed herein.

SUMMARY

According to certain aspects, the present invention provides new materials that combine the advantages of well-defined polymeric starting materials and the convenience of surface modification by physical methods into one package and, thus, offers a general and powerful platform suitable for use in numerous applications.

According to certain aspects, the present invention provides well-defined conjugated and non-conjugated polymeric starting materials that can be formed as thin films or coatings to functionalize surfaces with chemical, biological and nano materials. Such functionalized surfaces can be used in the sensing, energy, medical and biotechnology industries. Thin films can optionally be characterized as films having a thickness on the order of about 1 nm to about 1 μm.

According to one aspect, the present invention provides well-defined conjugated polymeric starting materials based on polymers of thiophene, fluorene or benzathiadiazole of the general formula shown below.

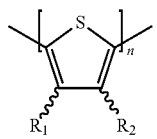

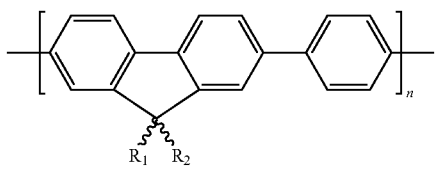

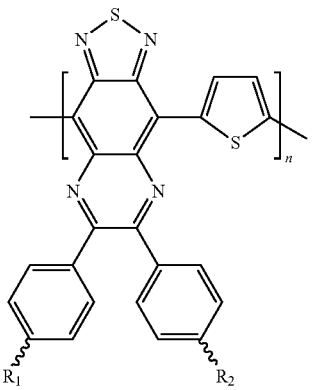

wherein:

⁓ =oligo- or poly-ethylene glycol, an optionally substituted alkyl chain or an optionally substituted conjugated chain where the chains are optionally substituted with polyethylene glycol or polyethelyneimine;

n=any integer greater than 1; and $R_1$ and/or $R_2$=H, alkyl, alkene, alkyne, where the number of carbon atoms are 1 to 4 in the case of alkyl, 2 to 6 in the case of alkene, and 2 to 6 in the case of alkyne, OH, Br, Cl, I, F, SH, COOH, $NH_2$, CHO, maleimide, NHS ester, a heterocyclic compound that can form a metal complex, a carbohydrate, a protein, a peptide, DNA, RNA, an antibody, an antigen, an enzyme, a bacteria, a redox molecule, a host molecule, a guest molecule, a hapten, a lipid, a microbe, an aptamer, or a sugar; wherein $R_1$ can be the same or different as $R_2$ and wherein at least one of $R_1$ and $R_2$ is $NH_2$, COOH, OH or SH.

According to one aspect, the present invention provides well-defined conjugated polymeric starting materials based on polymers of thiophene, fluorene or benzathiadiazole that comprise water soluble side-chains comprising at least one of an alcohol, an amine and a carboxylic acid. Shown below are thiophene-, fluorene- and benzathiadiazole-based polymer starting materials derivatized with alcohol groups.

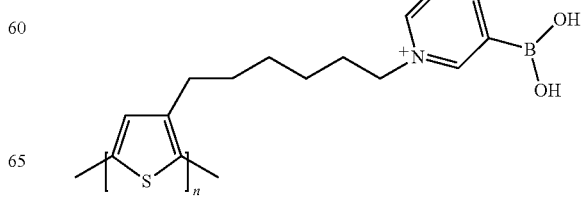

-continued

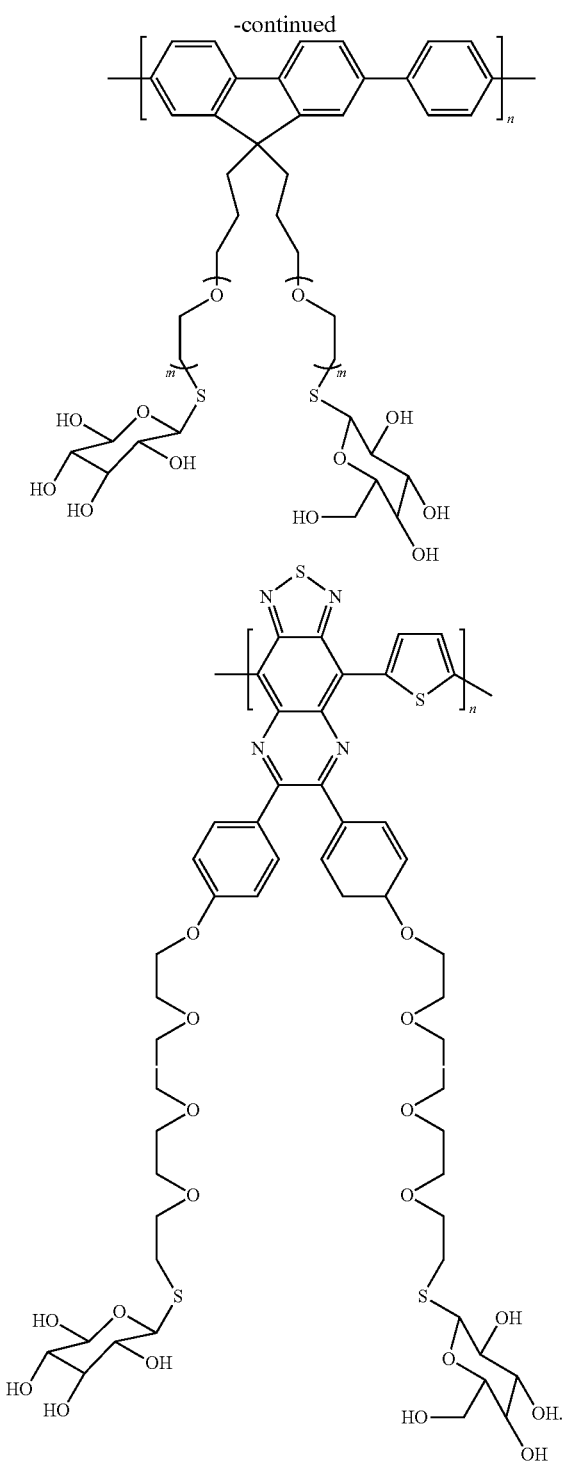

According to another aspect, the present invention provides well-defined non-conjugated polymeric starting materials based on alkyl chain polymers of the general formula shown below.

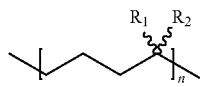

wherein:

〜〜〜 = oligo- or poly-ethylene glycol, an optionally substituted alkyl chain or an optionally substituted conjugated chain where the chains are optionally substituted with polyethylene glycol or polyethelyneimine;

n = any integer greater than 1;

$R_1$ and/or $R_2$ = H, alkyl, alkene, alkyne, OH, Br, Cl, I, F, SH, COOH, $NH_2$, CHO, maleimide, NHS ester, a heterocyclic compound that can form a metal complex, other applicable functional groups, a carbohydrate, a protein, a peptide, DNA, RNA, an antibody, an antigen, an enzyme, a bacteria, a redox molecule, a host molecule, a guest molecule, a hapten, a lipid, a microbe, an aptamer, or a sugar;

wherein $R_1$ can be the same or different as $R_2$ and wherein at least one of $R_1$ and $R_2$ is $NH_2$, COOH, OH or SH.

According to another aspect, the present invention provides well-defined non-conjugated polymeric starting materials based on alkyl chain polymers that comprise water soluble side-chains comprising at least one of an alcohol, an amine and a carboxylic acid, as shown below.

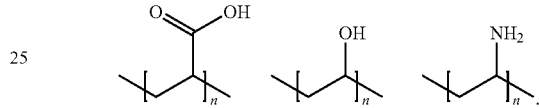

According to a further aspect, the present invention provides surfaces modified with the aforementioned polymeric starting materials. Such surfaces are contemplated to be, without limitation, electrode surfaces, for example, carbon electrode surfaces and metallic electrode surfaces. Other surfaces contemplated can be, without limitation, semiconducting surfaces.

According to still another aspect, the present invention provides surfaces modified with surface-coupled redox active molecules.

According to yet another aspect, the present invention provides methods for modifying surfaces with the polymeric starting materials mentioned directly above. Such methods are important for developing new materials comprising modified surfaces with biological, chemical and/or nano-functionalities.

The present invention may address one or more of the problems and deficiencies of the prior art discussed above. However, it is contemplated that the invention may prove useful in addressing other problems and deficiencies, or provide benefits and advantages, in a number of technical areas. Therefore the claimed invention should not necessarily be construed as being limited to addressing any of the particular problems or deficiencies discussed herein.

BRIEF DESCRIPTION OF THE DRAWINGS

These and other feature of this invention will now be described with reference to the drawings of certain embodiments which are intended to illustrate and not to limit the invention.

FIG. 3 shows SEM images of a glassy carbon electrode before and after formation of a thin film thereon based on Polymer Starting Material (1).

DETAILED DESCRIPTION OF THE PREFERRED EMBODIMENTS

Figure 1:
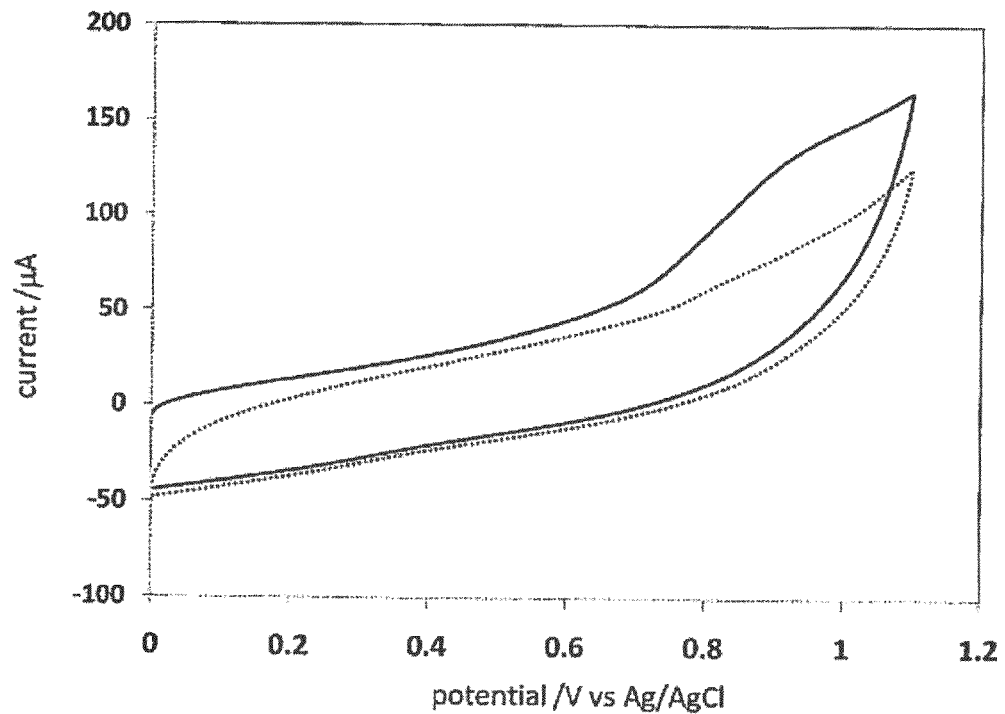
FIG. 1 shows a cyclic voltammogram of Polymer Starting Material (1), carried out in 0.1 M aqueous $NaClO_4$ solution.

Further aspects, features and advantages of this invention will become apparent from the detailed description which follows.

Well-defined polymeric starting materials for surface modification are described herein. Such polymeric starting materials in accordance with the present invention can be, for example, conjugated polymers based on thiophene, fluorene or benzathiadiazole that comprise water soluble side-chains such as an alcohol, an amine or a carboxylic acid. For example, the polymer denoted below as Polymeric Starting Material (1) is representative of a well-defined conjugated polymeric starting material in accordance with the present invention. Other such polymeric starting materials in accordance with the present invention can be, for example, non-conjugated polymers based on alkyl chain polymers that comprise water soluble side-chains comprising at least one of an alcohol, an amine and a carboxylic acid. For example, the polymer denoted below as polymeric starting material (2) is representative of a well-defined non-conjugated polymeric starting material in accordance with the present invention.

The surfaces to be modified with polymeric starting materials in accordance with the present invention are not particularly limited and can be, without limitation, a conducting surface. A representative conductive surface may be, for example, a metallic surface, such as a metallic electrode or a carbon surface, such as a carbon, or glassy carbon, electrode. Other surfaces contemplated by the present invention are semiconducting surfaces, such as those based on p- or n-doped silicon, indium tin oxide (ITO), titanium oxide ($TiO_x$), boron-doped diamond and the like.

The properties of the surfaces to be modified with polymeric starting materials in accordance with the present invention can be tuned to a desired application. The modification can be carried out to tune such surface properties as roughness, hydrophilicity, hydrophobicity, surface charge, surface energy, biocompatibility and reactivity. For example, by choosing $R_1$ and $R_2$ as polar and/or ionic functional groups, such as an OH group and/or a COOH group, the surface can be made hydrophilic. By choosing $R_1$ and $R_2$ as hydrophobic groups such as alkyl, alkenyl and alkynyl groups, the surface can be made more hydrophobic. By choosing $R_1$ and $R_2$ as perflouro compounds, the surface can be made highly oleophobic or lipophobic and hydrophobic. By choosing $R_1$ and $R_2$ as $NH_2$ and/or COOH and/or $PO_4^{2-}$, the surface can be made more hydrophobic. By choosing $R_1$ and/or $R_2$ as any amino acid such as lysine and valine, the surface can be rendered biocompatible.

Methods of modifying surfaces with polymeric starting materials in accordance with the present invention involve electrochemical methods. Such methods generally lead to an electrochemically deposited thin film or coating on the surface being modified. Electrochemical methods of surface modification offer certain advantages over other known physical methods. Such advantages are a more confined nature of the coating, a more durable conformal coating, less time required for the coating process and better monitoring of the coating process.

Methods of modifying surfaces with polymeric starting materials in accordance with the present invention may be, for example, 1) preparing a solution comprising a polymeric starting material in accordance with the present invention; 2) immersing into the solution a surface to be modified; 3) applying an electrochemical signal to the solution; and 4) forming at least one thin film or coating on the surface being modified. The electrochemical signal can be, for example, a voltage, a voltage scan or a current.

The thin films or coatings formed by methods in accordance with the present invention can have any desired and practical thickness. The thickness can be in the range of as little as about one nanometer to as large as about hundreds of microns. The thin films or coatings described herein are also strongly adhered to the surface being modified. The methods in accordance with the present invention can be carried out in either aqueous media or in non-aqueous media, depending on the solubility of the polymer starting material.

If desired, surfaces modified with the polymer starting materials according to the present invention can be further modified to further tune the properties of the system to a particular application. For example, surface bound polymers in accordance with the present invention can be further functionalized with highly conjugated molecules or metal complexes to form surface-coupled redox active molecules. Such surface-coupled redox active molecules can be, without limitation, ferrocene and derivatives thereof; bipyridine coordination complexes based on ruthenium, osmium, iron, or copper and derivatives thereof; and phenanthroline coordination complexes based on ruthenium, osmium, iron, or copper and derivatives thereof.

The concepts of the present invention will now be further described by reference to the following non-limiting examples of specific polymer starting materials and exemplary techniques for surface modification using the polymer starting materials. It should be understood that additional polymers and additional techniques of formation are also comprehended by the present invention.

Example 1

Surface Modification with Polymer Starting Material (1)

Scheme 1 below illustrates the modification of an electrode surface with Polymer Starting Material 1. Without wishing to be bound by any particular theory, it is contemplated that Polymer Starting Material 1 binds to a given surface through the oxygen atoms of the —OH groups of the glucose moiety. Other binding mechanisms (such as binding through the N and/or S molecules of the heterocyclic moiety or C of the conjugated polymer backbone) may also be contemplated.

Scheme 1
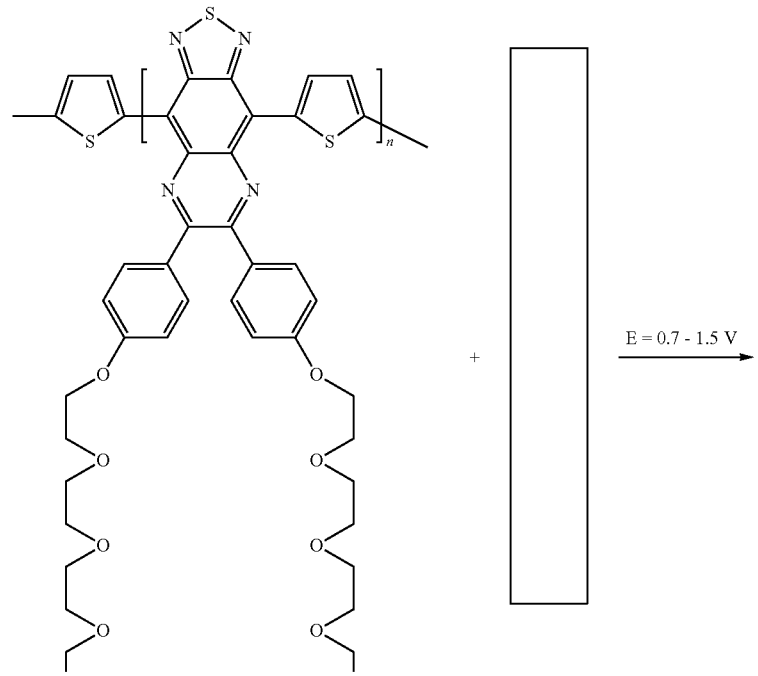
Polymer Starting Material (1)
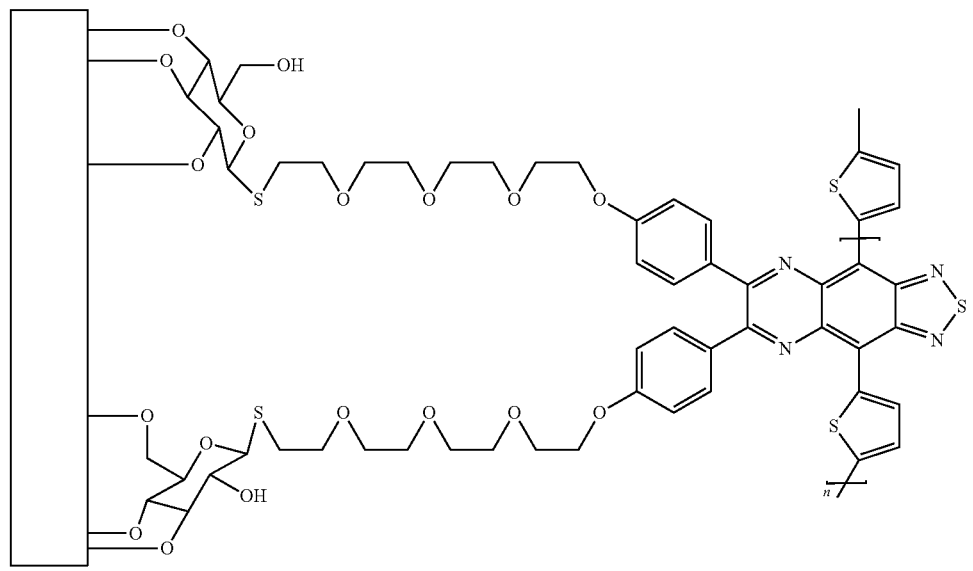

Polymer Starting Material 1 was added to a 0.1 M $NaClO_4$ aqueous solution. The solution is then transferred to an electrochemical vessel adapted for cyclic voltammetry with a standard three-electrode setup using glassy carbon as the working electrode, platinum as the counter electrode and Ag/AgCl (saturated KCl) as the reference electrode. The electrodes are then immersed in the solution and a voltage, generally between 0.2-2.5 V, or 0.7-1.5 V, is applied thereto, which induces formation of a thin film based on Polymer Starting Material 1 on at least one of the electrodes. The length of time that the voltage is applied can vary, for example, from 2-30 seconds, 5-60 seconds, or 1-10 minutes, depending on factors such as the electrode material and the reaction composition.

Polymer Starting Material (1) is identified to undergo electrochemical oxidation and subsequent thin film formation on carbon and metallic electrodes. FIG. 1 shows cyclic voltammetry results for Polymer Starting Material (1) in a 0.1 M $NaClO_4$ aqueous solution. The solution was cycled twice. The solid line is representative of the first cycle and the dotted line is representative of the second cycle. The first cycling of the solution produces a broad peak at about 0.9 V. This peak suggests oxidation of the polymer. The second cycling of the solution reveals an absence, or marked decrease in magnitude, of the same peak at about 0.9 V and suggests film formation on carbon and metallic electrodes.

Figure 2:
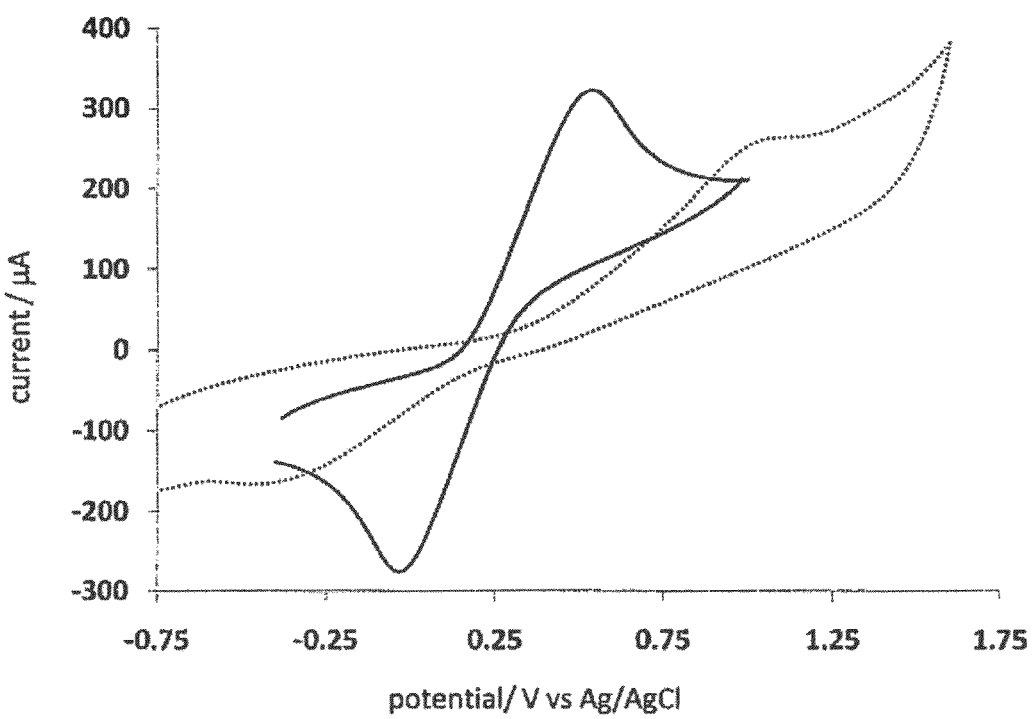
FIG. 2 shows a cyclic voltammogram of 10 mM aqueous potassium ferrocyanide solution at a glassy carbon electrode before and after formation of a thin film thereon based on Polymer Starting Material (1).

FIG. 2 shows cyclic voltammetry results for Polymer Starting Material (1) in a 10 mM $K_4[Fe(CN)_6].3H_2O$ (potassium ferrocyanide) aqueous solution before and after thin film formation at a glassy carbon electrode. The solution was then cycled twice. The solid line is representative of the first cycle, e.g., before thin film formation at a glassy carbon electrode, and the dotted line is representative of the second cycle, e.g., after thin film formation at a glassy carbon electrode. The first cycling of the solution produces a peak current of about 325 µA. This peak suggests potassium ferrocyanide oxidation. The second cycling of the solution reveals a decrease in peak current to about 275 µA. The decrease in peak current of about 50 µA suggests a lower level of potassium ferrocyanide oxidation, which is consistent with thin film formation of Polymer Starting Material (1) on the glassy carbon electrode.

Figures 3A, 3B:
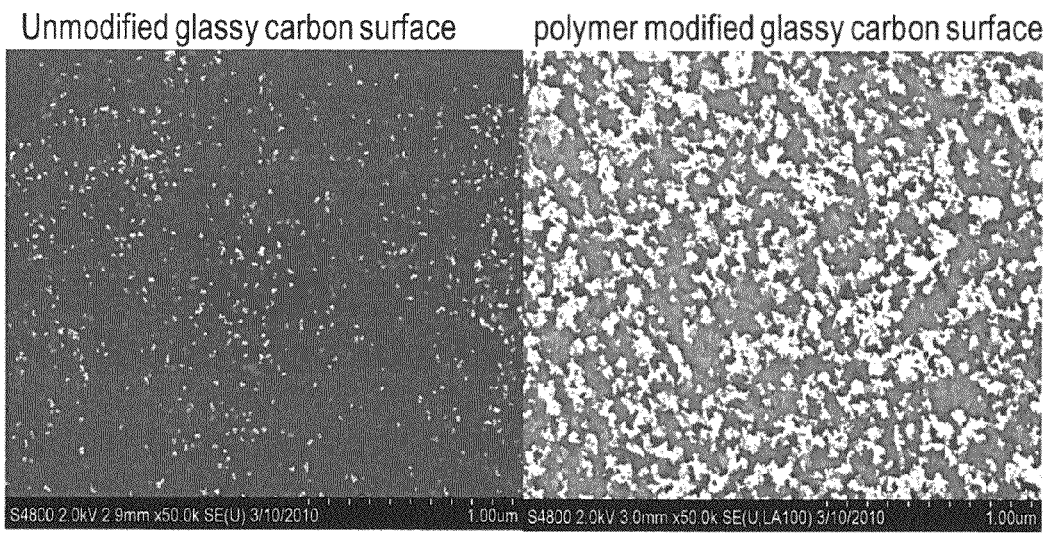
FIG. 3A shows the SEM image before polymer thin film formation and FIG. 3B shows the SEM image after polymer thin film formation.
Figure 4:
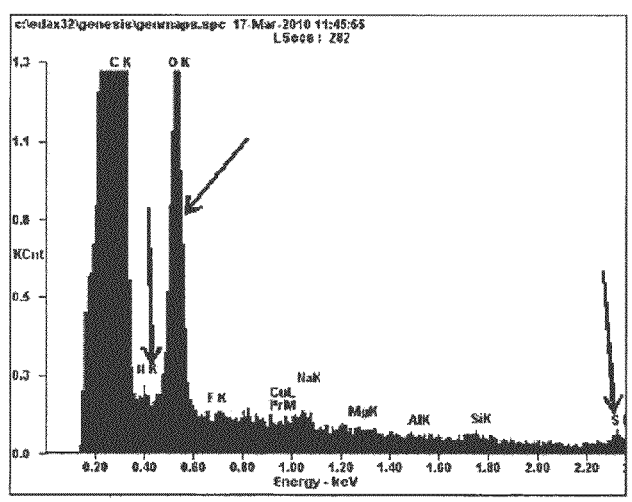
FIG. 4 shows elemental analysis of the Polymer Starting Material (1) film on a glassy carbon electrode.

FIG. 3 shows SEM images of a glassy carbon electrode before (FIG. 3A) and after (FIG. 3B) formation of a film thereon based on Polymer Starting Material (1). FIG. 4 shows Energy-Dispersive X-Ray Spectroscopy (EDS) elemental analysis of the Polymer Starting Material (1) film on a glassy carbon electrode. The peaks at about 0.25, 0.40, 0.55 and 2.30 keV indicate the presence of C, N, O and S, respectively, from Polymer Starting Material (1).

Example 2

Surface Modification with Polymer Starting Material (2)

Scheme 2 below illustrates the modification of an electrode surface with Polymer Starting Material 2. Without wishing to be bound by any particular theory, it is contemplated that Polymer Starting Material 2 binds to a given surface through the nitrogen atoms of the amine side chains. Other binding mechanisms (such as binding through the nitrogen atoms in the polymer chain) may also be contemplated.

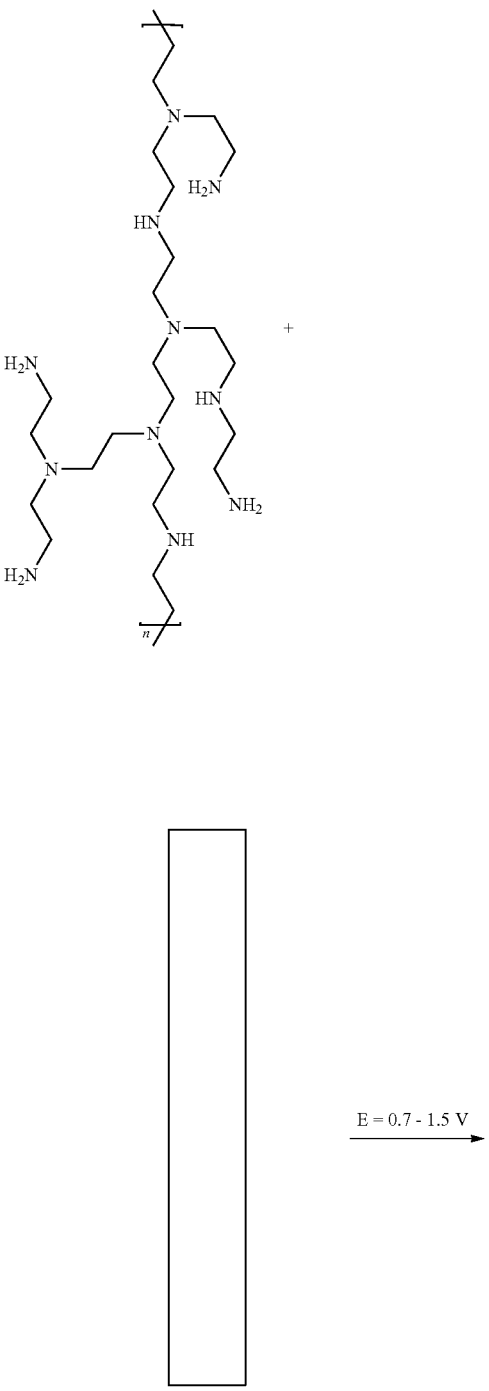

Scheme 2

$E = 0.7 - 1.5$ V

Polymer Starting Material (2)

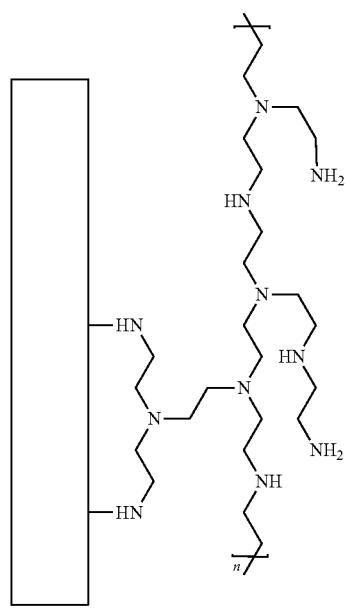

Polymer Starting Material 2 was added to a 0.1 M NaClO$_4$ aqueous solution. The solution is then transferred to an electrochemical vessel adapted for cyclic voltammetry with a standard three-electrode setup using glassy carbon as the working electrode, platinum as the counter electrode and Ag/AgCl (saturated KCl) as the reference electrode. The electrodes are then immersed in the solution and a voltage, generally between 0.7-1.5 V, is applied thereto, which induces formation of a thin film based on Polymer Starting Material 2 on at least one of the electrodes.

Figure 5:
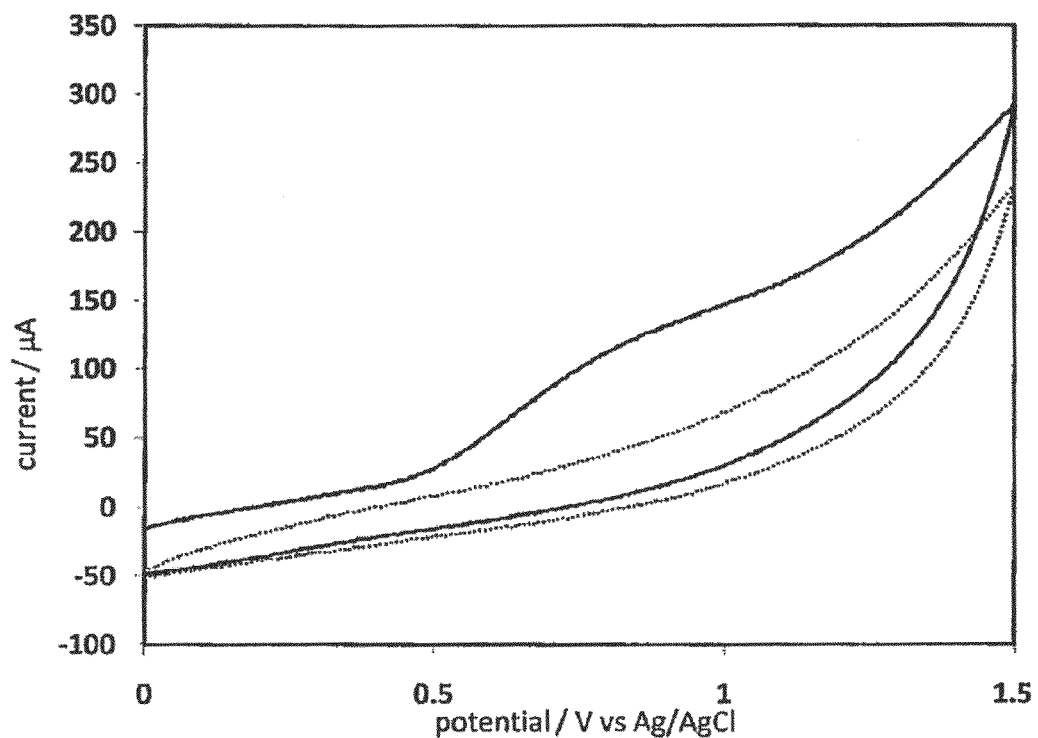
FIG. 5 shows a cyclic voltammogram of Polymer Starting Material (2), carried out in 0.1 M solution $NaClO_4$ solution.

Polymer Starting Material (2) has been identified to undergo electrochemical oxidation and subsequent film formation on a carbon electrode. FIG. 5 shows cyclic voltammetry results for Polymer Starting Material (2) in a 0.1 M NaClO$_4$ aqueous solution. The solution was cycled twice. The solid line is representative of the first cycle and the dotted line is representative of the second cycle. The first cycling of the solution produces a broad peak at about 0.85 V. This peak suggests oxidation of the polymer. The second cycling of the solution reveals an absence of the same peak at about 0.85 V and suggests film formation on a carbon electrode.

Example 3

Surface-Coupled Redox Active Molecules

Scheme 3 below illustrates further modification of the modified electrode surface of Example 2 with caffeic acid, such that the final thin film comprises at least one fragment of a caffeic acid molecule. A fragment being characterizable as a portion that can undergo a redox reaction through electron transfer with the electrode.

Scheme 3

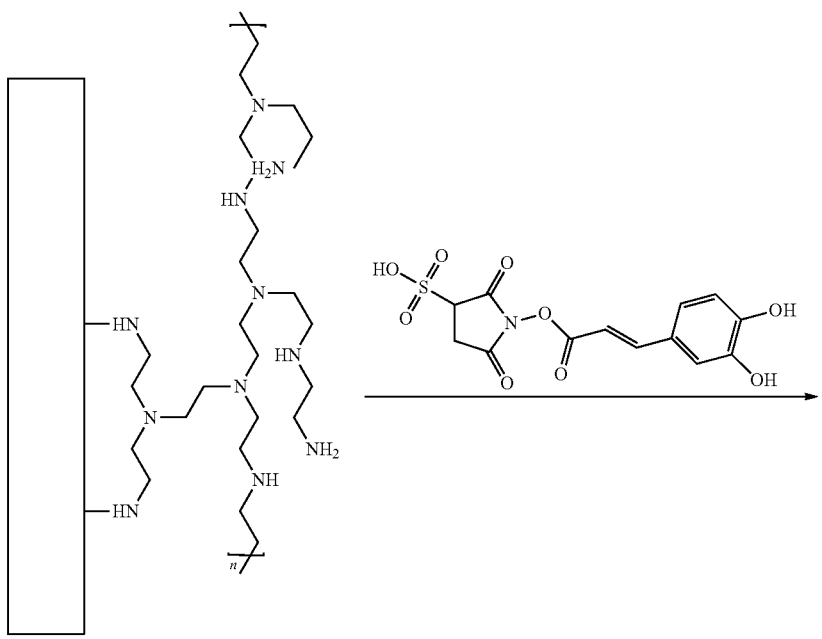

-continued

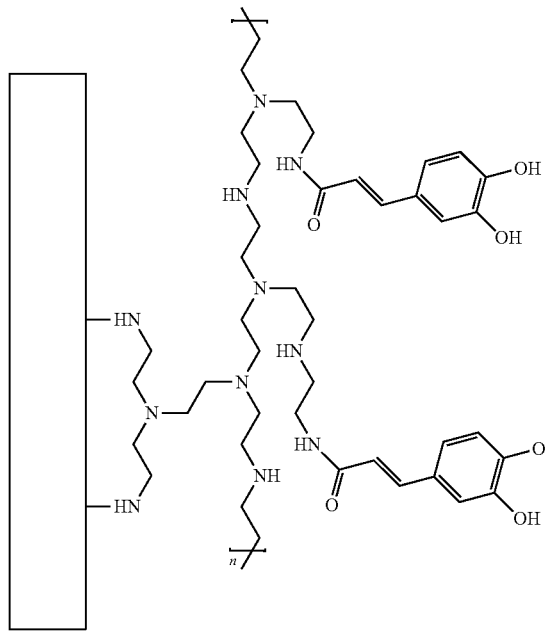

Figure 6:
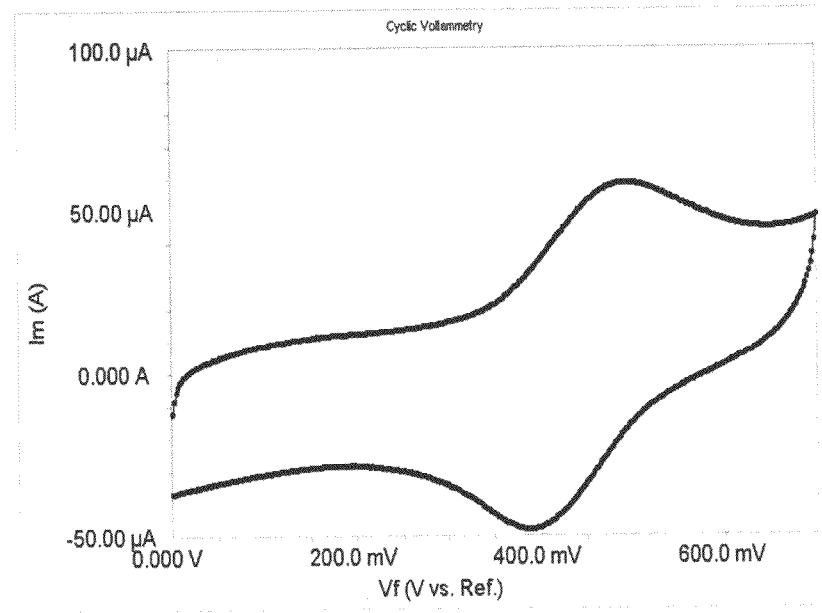
FIG. 6 shows a cyclic voltammogram of a Polymer Starting Material (2)-caffeic acid modified surface carried out in 0.1 M solution $NaClO_4$ solution.

Caffeic acid can be dissolved in any appropriate solvent to form a solution in which the Polymer Starting Material (2) modified surface is immersed. The reaction shown in Scheme 3 can be carried out in a buffer solution comprising 0.1 M 2-(N-morpholino)ethanesulfonic acid (MES) and 0.5 M NaCl at a pH of about 6.1. The reaction can be carried out at room temperature for about 120 minutes. FIG. 6 shows cyclic voltammetry results, in 0.1 M NaClO$_4$ aqueous solution, for a Polymer Starting Material (2)-caffeic acid modified surface. The solution was cycled once. The peak at about 0.5 V is indicative of oxidation of caffeic acid and the results are suggestive of the presence of surface-coupled redox active caffeic acid molecules.

Any numbers expressing quantities of ingredients, constituents, reaction conditions, and so forth used in the specification are to be understood as being modified in all instances by the term "about". Notwithstanding that the numeric ranges and parameters setting forth, the broad scope of the subject matter presented herein are approximations, the numerical values set forth are indicated as precisely as possible. Any numerical value, however, may inherently contain certain errors or inaccuracies as evident from the standard deviation found in their respective measurement techniques. None of the features recited herein should be interpreted as invoking 35 U.S.C. §112, ¶6, unless the term "means" is explicitly used.

Although the present invention has been described in connection with preferred embodiments thereof, it will be appreciated by those skilled in the art that additions, deletions, modifications, and substitutions not specifically described may be made without departing from the spirit and scope of the invention.

What is claimed is:

1. A method of making a thin film, wherein the thin film comprises a starting material of:

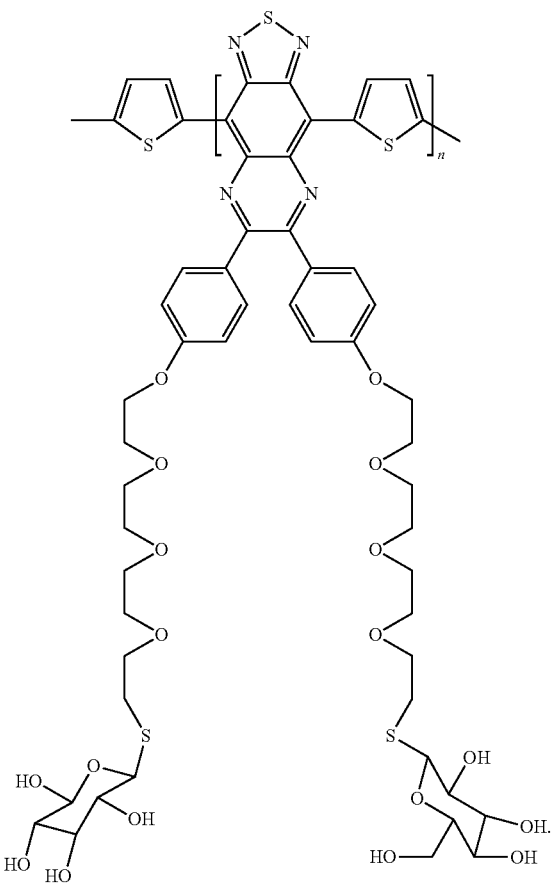

the method comprising:

1) preparing a solution comprising a starting material:
2) immersing into the solution at least one surface;
3) applying an electrochemical signal to the solution; and
4) forming at least one thin film or coating on the surface.

2. A method of making a thin film comprising:

1) preparing a solution comprising one of:

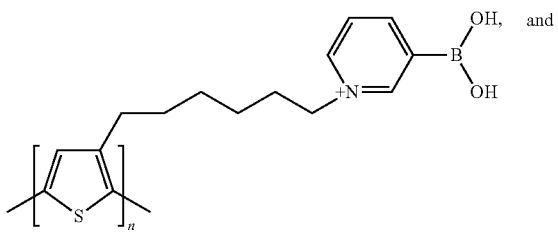

-continued

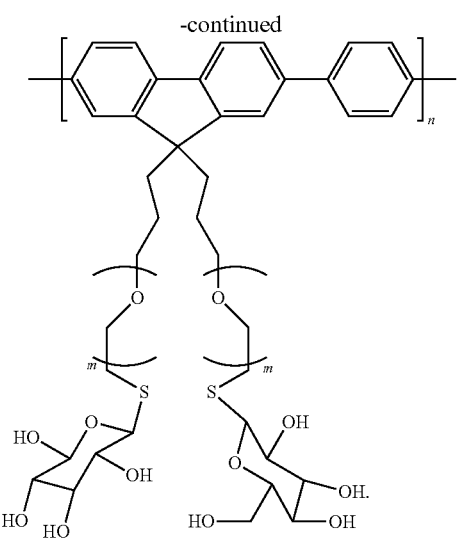

wherein n is any integer greater than 1 and m is 0, 1 or an integer greater than 1, and 2) immersing into the solution at least one surface;
3) applying an electrochemical signal to the solution; and
4) forming at least one thin film or coating on the surface.

* * * * *